Figure 1:
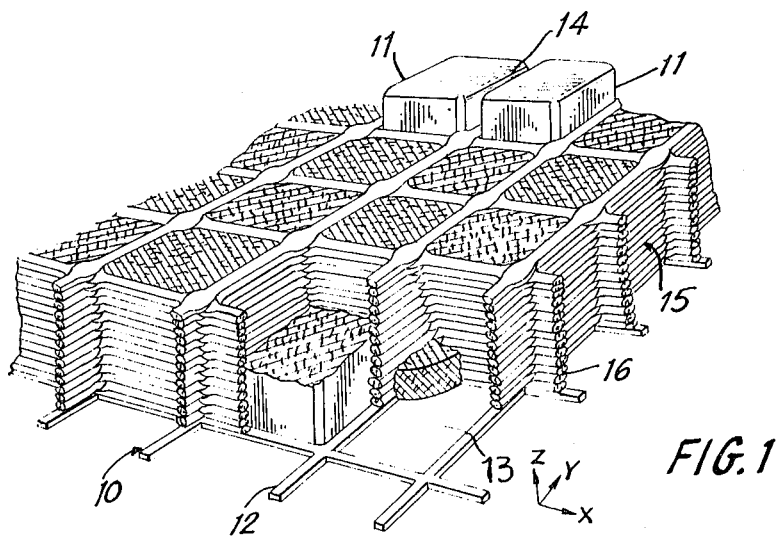

United States Patent [19]
Kromrey

[11] 3,887,739
[45] June 3, 1975

[54] HONEYCOMB STRUCTURES

[75] Inventor: Robert V. Kromrey, Fair Oaks, Calif.

[73] Assignee: Aerojet-General Corporation, El Monte, Calif.

[22] Filed: June 21, 1971

[21] Appl. No.: 155,215

Related U.S. Application Data

[60] Division of Ser. No. 875,433, Nov. 10, 1969, Pat. No. 3,694,284, which is a continuation-in-part of Ser. No. 648,447, June 23, 1967, Pat. No. 3,617,416.

[52] U.S. Cl. ............... 428/112; 156/197; 428/116; 428/117
[51] Int. Cl. ............................................ B32b 3/12
[58] Field of Search ............... 161/68, 69, 182, 198; 156/197, 292, 297; 52/615, 618; 29/455 LM

[56] References Cited
UNITED STATES PATENTS

| | | | |
|---|---|---|---|
| 880,784 | 3/1908 | Ferres | 161/69 X |
| 2,445,290 | 7/1948 | Gonda | 156/173 X |
| 2,477,852 | 8/1949 | Bacon | 161/68 |
| 2,606,133 | 8/1952 | Havens | 161/69 X |
| 2,744,042 | 5/1956 | Pace | 161/68 X |
| 2,902,395 | 9/1959 | Hirschy et al. | 156/172 X |
| 3,034,938 | 5/1962 | Puhr | 156/91 X |
| 3,210,233 | 10/1965 | Kummer et al. | 161/68 |
| 3,300,354 | 1/1967 | Duft | 156/169 |
| 3,373,480 | 3/1968 | Fuchs, Jr. | 29/471.1 X |
| 3,490,983 | 1/1970 | Lee | 161/68 X |
| 3,549,468 | 12/1970 | Messineo et al. | 161/68 |

*Primary Examiner*—George F. Lesmes
*Assistant Examiner*—Henry F. Epstein
*Attorney, Agent, or Firm*—John L. McGannon; John S. Bell

[57] ABSTRACT

A honeycomb structure in accordance with the present disclosure comprises a matrix having a plurality of filament rovings arranged in overlapping relationship to form cellular walls. The overlapping rovings are bonded together by a bonding means. A plurality of dies are formed in a configuration to form a grid of slots corresponding to the walls of the honeycomb structure. The filament rovings are wound into the slots in overlapping relationship to assume the desired configuration. Preferably, the rovings are wrapped so that at the intersection of crossing and overlapping filament rovings, the rovings are flattened into chamfered areas of the cells so as to increase the area of the bond between overlapping and intersecting rovings, thereby increasing the strength of the honeycomb wall structure in a Z or radial direction.

8 Claims, 9 Drawing Figures

PATENTED JUN 3 1975    3,887,739

SHEET 2

HONEYCOMB STRUCTURES

This application is a division of my co-pending application Serial No. 875,433, filed November 10, 1969 now U.S. Patent 3,694,284, which application is a continuation-in-part of copending application Ser. No. 648,447, for "Honeycomb Structures" filed June 23, 1967, now U.S. Pat. 3,617,416 and assigned to the same assignee as the present application.

This invention relates to honeycomb structures, and particularly to filled cell honeycomb structures exhibiting high strength in three dimensions.

In the aforementioned copending application, there is described a honeycomb structure comprising a combination of an ablative shell and a supporting honeycomb structure. The fibers of the honeycomb cell are intertwined with the fibers of the ablative shell so that the structure retains its strength after being heated to temperatures at which the resin would normally decompose. In one embodiment described in the aforementioned application, there is described a honeycomb structure in which the cells are filled with precured resin-reinforced dies having a sinusoidal shape. The cell walls are formed of strips of fabric, and the dies press the fabric together to form the honeycomb structure. However, it has been found that the junction of the fabric forming the honeycomb structure sometimes failed and separated thereby causing a weakening in the structure in a plane normal to the junction. These junctions are supported only by the bonding strength of the resin joining the fabric, and are sometimes hereinafter called "node bonds."

It is an object of the present invention to provide a honeycomb structure which provides a high strength in three dimensions, even at intense temperatures.

Another object of the present invention is to provide a filament wound honeycomb structure capable of supporting loads in three dimensions.

Another object of the present invention is to provide a supporting honeycomb structure in which the honeycomb structure comprises filament wound material.

In accordance with the present invention, a honeycomb structure comprises a filament wound structure woven in a grid so that the filaments will support loads in the plane of the grid. Filament material may be molded to form a cell filler to increase strength in the third dimension.

According to one feature of the present invention, the bonds, or cross-over points between the woven filament rovings are flattened thereby providing an enlarged bonding surface thereby increasing the bond strength in the direction normal to the plane of the rovings.

Another object of the present invention is to provide a honeycomb structure having woven intersecting cell walls, thereby eliminating the objective node bonds.

Figure 2B:
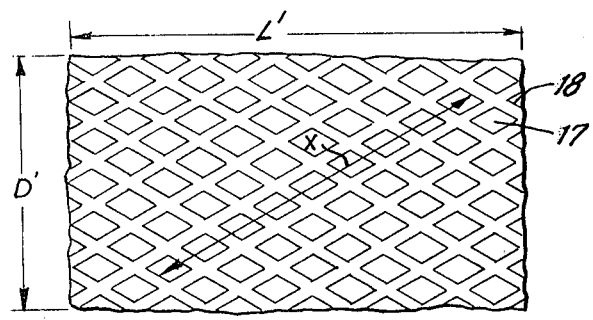
Figure 2A:
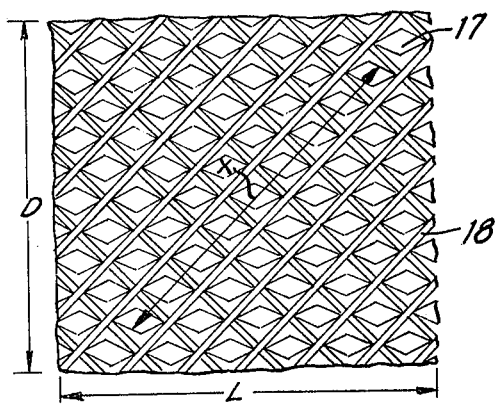
Figure 3:
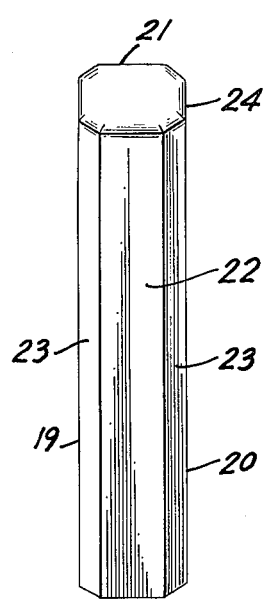
Figure 4:
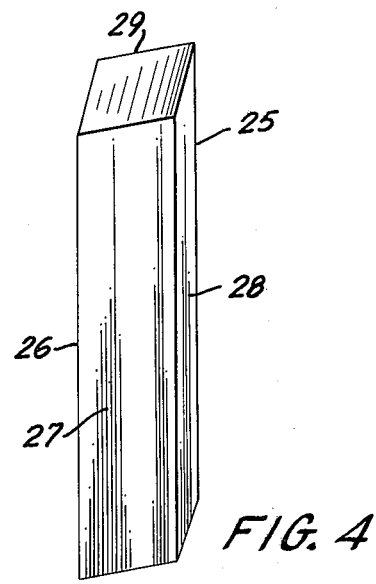

The above and other features of this invention will be more fully understood from the following detailed description and the accompanying drawings, in which:

FIG. 1 is a perspective view of a portion of a honeycomb structure in accordance with the presently preferred embodiment of the present invention;

FIGS. 2A and 2B, taken together, illustrate a method of debulking the honeycomb structure illustrated in FIG. 1;

FIGS. 3 and 4 illustrate various dies for use in constructing the honeycomb structure in accordance with the present invention; and FIGS. 5, 6, 7 and 8 illustrate different methods of wrapping filament rovings to form honeycomb structures in accordance with the present invention.

In FIG. 1 there is illustrated a mold or die 10 having a plurality of pillars or filler cells 11 attached to a plate 12. Pillars 11 form an array of continuous slots 14 between them.

Pillars 11, which are sometimes hereinafter referred to as cell filler material, are constructed of suitable honeycomb cellular material, such as quartz, carbon and graphite yarns, alone or in combination, impregnated with a phenolic or other ablative resin. The fibers of quartz, carbon and/or graphite are oriented in a co-linear plane by a collimation process involving drawing the yarn fibers from supply spools through a furnace where the yarn is then impregnated with phenolic resin and heated to an elongated cellular shape. The strands of yarn are thereafter cooled, and the strands are collected on drums and retained in cold storage. When it is desired to use the strands, the strands are heated in a pressure mold to the desired shape, such as square, rectangular or diamond shaped. The molded strands are then cut to a desired length.

Plate 12 is formed from stainless steel sheet stock containing precision photo-etched holes 13. The molded cell fillers or impregnated strands 11 are positioned into the holes 13 in plate 12 so as to stand or protrude from the surface of the plate. With the cell fillers 11 in place in apertures 13 of plate 12, an array of continuous channels or spaces 14 between pillars 11 is formed. As will be more fully understood hereinafter, the width of spaces 14 is preferably of the order of the diameter of the cell wall material.

The cell walls 15 comprise a plurality of rovings 16 woven through the spaces 14 between adjacent pillars of cell filler material 11. By way of example, roving 16 may comprise suitable quartz or graphite rovings of the order of about 0.010 to 0.015 inches in diameter, and the space 14 between pillars 11 may be between 0.015 and 0.025 inch. The rovings may be preimpregnated with phenolic resin prior to being woven into spaces 14, or they may be wetted with resin during the winding process. During the winding process, rovings 16 are wound in moderate tension via a payoff head (not shown) through spaces 14 to overlay previous wound rovings.

In FIG. 2A there is illustrated a plurality of diamond shaped molds or cells 17 between which rovings are wrapped to form cell walls 18. The honeycomb structure illustrated in FIG. 2A is debulked by loading the structure in tension along the direction of dimension L and in compression along the direction of dimension D thereby increasing dimension L to dimension L' illustrated in FIG. 2B and decreasing dimension D in FIG. 2A to dimension D'. In the case of a cylindrical or conical honeycomb wall where D and D' are diameters, the diameter D decreases to dimension D' while the length of the cylinder or cone increases to length L'.

The separation between opposite walls of the cell remains constant during a debulk process as illustrated by dimension X. Thus, the cell size remains constant while the orientation of the cell walls may be moved to different diagonal positions. In the case of a cylindrical or conical body, the body is loaded along the diameter to reduce the diameter and increase the length of the body. In the case of the flat panel, the body is laterally loaded causing inward movement in one plane and expansion in an opposite plane. The lateral movement of the flat body is proportional to the decrease in circumference of the cylinder or cone, and the length increase of a flat panel is equal to the axial growth of a cylinder or cone.

Prior to, during, or after the debulk process to form the finished shape of the structure, the cell wall is preferably additionally impregnated with phenolic or other suitable resin by immersing the entire structure into a prepared resin solution. The assembly is then vacuum and pressure cycled to assure resin impregnation throughout the yarn. Following impregnation with resin, the resin is staged and cured or molded under pressure to form the completed part. The molding pressure may be applied by the lateral compression on the part imposed during the debulk process.

FIGS. 3 and 4 illustrate different cellular fillers for use in constructing honeycomb cells in accordance with the present invention. In FIG. 3, there is illustrated an orthogonal cell having opposite cell walls 19 and 20 and 21 and 22. Between cell walls 19, 22, 20 and 21, the corners are chamfers 23. Preferably, the distance between opposite walls 19 and 20 and 21 and 22 is approximately 0.058 inches, and the surface width of each chamfer 23 is approximately 0.020 inches. The length of each cell is preferably of the order of about 0.68 inches. Preferably, the cells include tapered portion 24 at the outermost portion of the cells to guide rovings into slots 14 between the cells.

The type of cell illustrated in FIG. 3 is utilized for filler cells 11 in FIG. 1 wherein the chamfers enable the rovings 16 to be flattened in the region of the junction of the rovings to thereby increase the surface area of the resin bond between successive layers of rovings 16. The increased area of the bond increases the strength of the honeycomb structure in the Z direction, (along the length of filler cells 11) over that which might result from a lesser surface area between joined rovings. Also the volume of filament material present at intersections is greater than elsewhere due to the cross-over of rovings forming each intersection wall. The additional volume of filament material at the intersections precludes crushing the material under the pressure of molding and debulking processes.

FIG. 4 illustrates a different filler cell 25 which is of a substantially diamond shape having opposite walls 26, 27, 28 and 29. The matching edges of walls 26 through 29 may or may not be chamfered as illustrated in FIG. 3. The cell illustrated in FIG. 4 is particularly useful for winding the cell walls in an orthogonal pattern and then debulking the walls to a diamond configuration as described in connection with FIGS. 2A and 2B.

Figure 5:
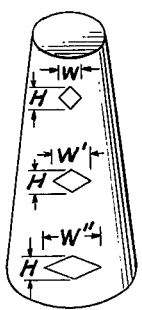

FIGS. 5 through 8 illustrate various methods of winding filament rovings onto a conically or frustoconically shaped object. FIG. 5 illustrates a spiral-helical line of wrapping filament rovings which is determined by the angle formed by dies or cell fillers. The angle will change with each die or cell along the axis of the cone and the diamond shape of each die or cell becomes narrower towards the apex of the cone. In the type of arrangement illustrated in FIG. 5, the width W to W'' of each diamond is proportional to the circumference of the cone at the location so that there are a constant number of cells about the periphery of the cone at any location along the length of the cone. Also, it is preferred that the height H of each cell be equal to all other cells. In winding on the cone, it is obvious that the groove will follow constantly changing angle in a path along the cone surface as determined by the changing diamonds.

Figure 6:
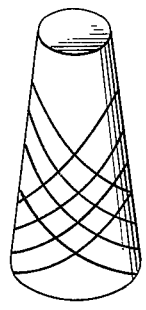
Figure 7:
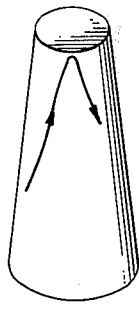
Figure 8:
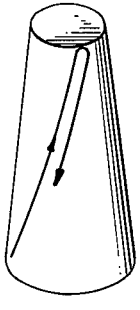

FIG. 6 illustrates another cone wherein the filament windings are equally spaced in a helical pattern. FIG. 7 illustrates one method of wrapping a helical winding wherein the filament rovings may be directed up one side of the helix and down an opposite side in an oppositely wrapped direction. To solve the problem of the turnaround of the payoff head at each end of the cone, a switch mechanism (not shown) may be utilized so that the filament rovings would travel up one side and back down in an adjacent groove as illustrated in FIG. 8.

The present invention thus provides a filament wound honeycomb structure capable of withstanding relatively high temperatures, and usually above the distruction temperature of the resin. In this sense, the honeycomb is an ablative structure highly suitable for high temperature applications.

Wall structures constructed in accordance with the present invention display a high degree of strength. For example, a honeycomb structure constructed of carbon fibers wrapped on graphite filler cells and having dimensions as hereinbefore set forth have exhibited tensile strength of the order of between about 10,000 psi to 15,000 psi in the X and Y direction (hoop and meridional planes) and as much as 50,000 psi in the Z direction (radial plane). (See FIG. 1) The high tensile strength results from the three dimensional characteristics of the material and permits balancing of the strength in the X, Y and Z directions into any desired combination.

Resistance to impulse loading is derived from the use of dissimilar materials in the cells, for example, high modulus graphite and carbon fibers. Resistance to impulse loading is also affected by the geometric orientation of the part, and the high radial strength. Resistance to erosion at high temperatures, and particularly temperatures above the char-temperatures of the resin is a function of the cell filler area to cell wall area ratio at the exposed surface. Greater erosion existence is realized by increasing the area ratios. Cells in accordance with the present invention are 50 percent to more than 70 percent cell material for an area ratio of between 1:1 to 3:1. Also, where an increased number of edge-orientated fibers of the cell filler material is exposed, particularly at the surface of the honeycomb structure, erosion resistance is greater. An increased number of edge orientated fibers in the filler material also has a tendency to lower the thermal gradient in the Z direction, thereby reducing the thermal shock sensitivity over that associated with fibers which are parallel to the surface.

By utilizing cellular walls of the order of about 0.06 inches upon a side, the filler area may comprise as much as 50 percent to 70 percent of the entire composite area, and by varying the relative dimensions of the wall material and of the filler the thermal and strength characteristics of the honeycomb structure may be varied as desired.

This invention is not to be limited by the embodiments shown in the drawings and described in the description, which are given by way of example and not of limitation.

What is claimed is:

1. A honeycomb structure comprising: a body having a plurality of open cells and means defining a number of walls surrounding said cells to provide a honeycomb configuration therefor, said means including a plurality of rovings high modulus fibrous arranged in stacked, intersecting relationship to each other, the portion of each roving at its intersections with adjacent rovings being flattened into chamfered areas so as to have a greater area then the portions of the roving between the intersections; and resin impregnated in said rovings throughout their lengths for bonding the overlapped rovings together.

2. A structure as set forth in claim 1, wherein is included a cell filler member for each cell, respectively, the filler members comprising cellular high modulus resin-impregnated yarns and being disposed in respective, spaced positions forming an array and defining a plurality of intersecting channels, the rovings being disposed in respective channels, said bonding means interconnecting the fillers to adjacent rovings.

3. A structure as set forth in claim 2, wherein each filler has a first pair of opposed faces and a second pair of opposed faces, there being a chamfer at the junction of each pair of adjacent faces.

4. A structure as set forth in claim 3, wherein each filler has a tapered outer end for guiding the rovings into the spaces adjacent thereto as the rovings are moved into position to form said walls.

5. A structure as set forth in claim 2, wherein each cell and each filler are transversely diamond-shaped, the rovings being initially positioned in an orthogonal pattern.

6. A structure as set forth in claim 1, wherein said rovings are wrapped about frustoconical fillers and extend helically about the same.

7. A structure as set forth in claim 1, wherein each cell is diamond-shaped, the width of each cell decreasing as the apex end of the core is approached.

8. A structure as set forth in claim 1, wherein is included a cell filler in each cell, respectively, each filler being transversely polygonal and having a chamfer at the junction of each pair of adjacent sides, respectively, the junctions of said rovings substantially filling the regions between the chamfers of adjacent fillers to increase the bond area of said rovings.

* * * * *